(12) United States Patent
Aloush

(10) Patent No.: US 11,063,632 B2
(45) Date of Patent: *Jul. 13, 2021

(54) DOMAIN ESTABLISHMENT METHOD

(71) Applicant: Integrated Silicon Solution Israel Ltd., Tel Aviv (IL)

(72) Inventor: Avner Aloush, Netanya (IL)

(73) Assignee: Sigma Designs Israel S.D.I. LTD., Tel Aviv (IL)

( * ) Notice: Subject to any disclaimer, the term of this patent is extended or adjusted under 35 U.S.C. 154(b) by 109 days.

This patent is subject to a terminal disclaimer.

(21) Appl. No.: 16/533,591

(22) Filed: Aug. 6, 2019

(65) Prior Publication Data

US 2019/0363755 A1    Nov. 28, 2019

Related U.S. Application Data

(63) Continuation of application No. 14/953,479, filed on Nov. 30, 2015, now Pat. No. 10,439,674.

(60) Provisional application No. 62/085,571, filed on Nov. 30, 2014, provisional application No. 62/129,982, filed on Mar. 9, 2015.

(51) Int. Cl.
*H04B 3/54* (2006.01)

(52) U.S. Cl.
CPC .................................. *H04B 3/544* (2013.01)

(58) Field of Classification Search
CPC . H04L 41/5041; H04L 41/02; H04L 41/0816; H04B 3/544
See application file for complete search history.

(56) References Cited

U.S. PATENT DOCUMENTS

| | | | | |
|---|---|---|---|---|
| 9,202,042 B2* | 12/2015 | Gomez Martinez | ......................... H04L 9/0841 |
| 2005/0120246 A1* | 6/2005 | Jang | ......................... H04L 9/006 726/4 |
| 2006/0106963 A1* | 5/2006 | Sasaki | ..................... A63F 13/92 710/110 |
| 2008/0089300 A1* | 4/2008 | Yee | ........................ H04W 76/15 370/338 |
| 2008/0267147 A1* | 10/2008 | Niranjan | ............... H04W 8/005 370/338 |
| 2013/0109319 A1* | 5/2013 | Splitz | ................... H04W 56/001 455/63.1 |
| 2014/0126469 A1* | 5/2014 | Youtz | ..................... H04W 48/02 370/328 |
| 2015/0195162 A1* | 7/2015 | Gandham | ............ H04L 43/067 709/206 |
| 2015/0237666 A1* | 8/2015 | Cho | ....................... H04W 48/18 709/224 |

(Continued)

*Primary Examiner* — Hitesh Patel
*Assistant Examiner* — Eui H Kim
(74) *Attorney, Agent, or Firm* — Carmen C. Cook

(57) ABSTRACT

A network node includes a pushbutton to provide a button-press event and a pairer to receive the button-press event while not being in a secure domain. In response to the button-press, the pairer alternates between acting as an endpoint node and acting as a temporary domain master, until pairing is completed. In an alternative embodiment, the node includes a multi-pairer to receive the button press event and, in response, to open a pairing window, to become a domain master of a secure network and to join more than one other network node receiving a button press event to the secure network until the pairing window closes.

10 Claims, 14 Drawing Sheets

(56) References Cited

U.S. PATENT DOCUMENTS

2016/0205086 A1* 7/2016 Zhang .................. H04L 63/083
    726/6
2017/0093679 A1* 3/2017 Xu ........................ H04L 67/141

* cited by examiner

DOMAIN ESTABLISHMENT METHOD

CROSS REFERENCE TO RELATED APPLICATIONS

This application is a continuation of co-pending U.S. patent application Ser. No. 14/953,479, entitled DOMAIN ESTABLISHMENT, REGISTRATION AND RESIGNATION VIA A PUSH BUTTON MECHANISM, filed Nov. 30, 2015, now U.S. Pat. No. 10,439,674, issued Oct. 8, 2019, which claims priority to U.S. Provisional Patent Application No. 62/085,571, entitled PLC DOMAIN ESTABLISHMENT AND REGISTRATION AND RESIGNATION VIA PUSH BUTTON MECHANISM, filed Nov. 30, 2014, and U.S. Provisional Patent Application No. 62/129,982, entitled SECURE ADMISSION IN G.HN NETWORKS, filed Mar. 9, 2015, all of which are incorporated herein by reference for all purposes.

FIELD OF THE INVENTION

The present invention relates to communications networks generally and to joining of devices into secure networks in particular.

BACKGROUND OF THE INVENTION

A network of devices in a home initially begins as a non-secure network. However, it is typically desired to convert the non-secure network to a secure network. After power up, the devices, or "nodes", installed in the home create a non-secure domain with a default domain name.

After this unsecure domain is established, the user can convert the non-secure domain to a secure domain, usually through a push button procedure. This is shown in FIG. 1, to which reference is now made. A user 10 pushes the Push_P pushbutton of two nodes, labelled 2 and 5, in an unsecure domain 12. The two nodes perform a pairing procedure, after which nodes 2 and 5 establish a new secure domain 14, with a new domain name.

In order to completely convert unsecure domain 12 to secure domain 14, user 10 has to continue the pairing procedure between each node of unsecure domain 12 with one of the nodes from secure domain 14, as shown in FIG. 2. A similar process happens when user 10 wants to add a new node, such as the node labeled 1, to secure domain 14. User 10 has to perform the pairing procedure between the new node 1 and one of the nodes, such as node 2, from secure domain 14.

SUMMARY OF THE INVENTION

There is provided, in accordance with a preferred embodiment of the present invention, a network node including a pushbutton to provide a button-press event and a pairer to receive the button-press event while not being in a secure domain. In response to the button-press, the pairer alternates between acting as an endpoint node and acting as a temporary domain master, until pairing is completed.

Moreover, in accordance with a preferred embodiment of the present invention, the pairer includes a state switcher and a pairing unit. The state switcher switches the state of the network node between an endpoint state and a temporary domain master state. The pairing unit attempts pairing with another node when the network node is in the endpoint state and another node is in the temporary domain master state and attempts to pair with the another node when the network node is in the temporary domain master state and the another node is in the endpoint state.

Further, in accordance with a preferred embodiment of the present invention, the network node is connected on a powerline medium.

Still further, in accordance with a preferred embodiment of the present invention, the length of time as a temporary domain master is longer than the length of time as an endpoint. The length of time as a temporary domain master may be a randomized value. It may be between 1 and 4 seconds and the length of time as an endpoint may be 1 second.

Moreover, in accordance with a preferred embodiment of the present invention, the state switcher includes a permanent domain master unit to convert the network node from a temporary domain master to a conditional permanent domain master as a function of whether or not the another node, which paired as an endpoint to the network node, has not paired with a permanent domain master.

Additionally, in accordance with a preferred embodiment of the present invention, the state switcher includes a permanent domain master unit to convert the conditional permanent domain master to a permanent secure domain master after another node re-registered with the network node.

Further, in accordance with a preferred embodiment of the present invention, the pairer has a pairing window during which pairing can occur. For example, the pairing window is 120 seconds.

Still further, in accordance with a preferred embodiment of the present invention, the pairer includes a blocking unit, operative in the temporary domain master state and after receiving a pairing request from another network node, to block pairing with any other network node during the pairing window.

Moreover, in accordance with a preferred embodiment of the present invention, the pairer includes a multi-pairing unit, operative in at least the temporary domain master state and after receiving a pairing request from another network node, to enable pairing with multiple network nodes during the pairing window.

Additionally, in accordance with a preferred embodiment of the present invention, the pairer includes a merger to merge the node acting as temporary domain master into a single secure network with at least one other node operating as a temporary domain master.

There is also provided, in accordance with a preferred embodiment of the present invention, a network node including a pushbutton to provide a button press event and a multi-pairer to receive the button press event and, in response, to open a pairing window, to become a domain master of a secure network and to join more than one other network node receiving a button press event to the secure network until the pairing window closes.

There is also provided, in accordance with a preferred embodiment of the present invention, a method for a network node. The method includes providing a button press event, and, in response to the button press event and while not being in a secure domain, the node alternating between acting as an endpoint node and acting as a temporary domain master node until pairing is completed.

Additionally, in accordance with a preferred embodiment of the present invention, the method also includes attempting pairing with another node when the network node is in the endpoint state and the another node is in the temporary domain master state and when the network node is in the temporary domain master state and the another node is in the endpoint state.

Moreover, in accordance with a preferred embodiment of the present invention, the alternating includes converting the node from a temporary domain master to a conditional permanent domain master as a function of whether or not another node, which paired as an endpoint to the node, has not paired with a permanent domain master.

Further, in accordance with a preferred embodiment of the present invention, the alternating includes converting the conditional permanent domain master to a permanent secure domain master after another node re-registered with the node.

Still further, in accordance with a preferred embodiment of the present invention, the method includes a pairing window during which pairing occurs. For example, the pairing window is 120 seconds.

Additionally, in accordance with a preferred embodiment of the present invention, in the temporary domain master state and after receiving a pairing request from another network node, the alternating includes blocking pairing with any other network node during the pairing window.

Moreover, in accordance with a preferred embodiment of the present invention, in at least the temporary domain master state and after receiving a pairing request from another network node, the alternating includes enabling pairing with multiple network nodes during the pairing window.

Further, in accordance with a preferred embodiment of the present invention, the enabling includes merging the network node acting as temporary domain master into a single secure network with at least one other node operating as a temporary domain master.

There is additionally provided, in accordance with a preferred embodiment of the present invention, a method including receiving a button press event and joining multiple non-secure network nodes into a secure domain within a single pairing window.

Finally, in accordance with a preferred embodiment of the present invention, the joining includes opening a pairing window in response to the receiving, becoming a domain master of a secure network, and adding more than one other network node receiving a button press event to the secure network until the pairing window closes

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
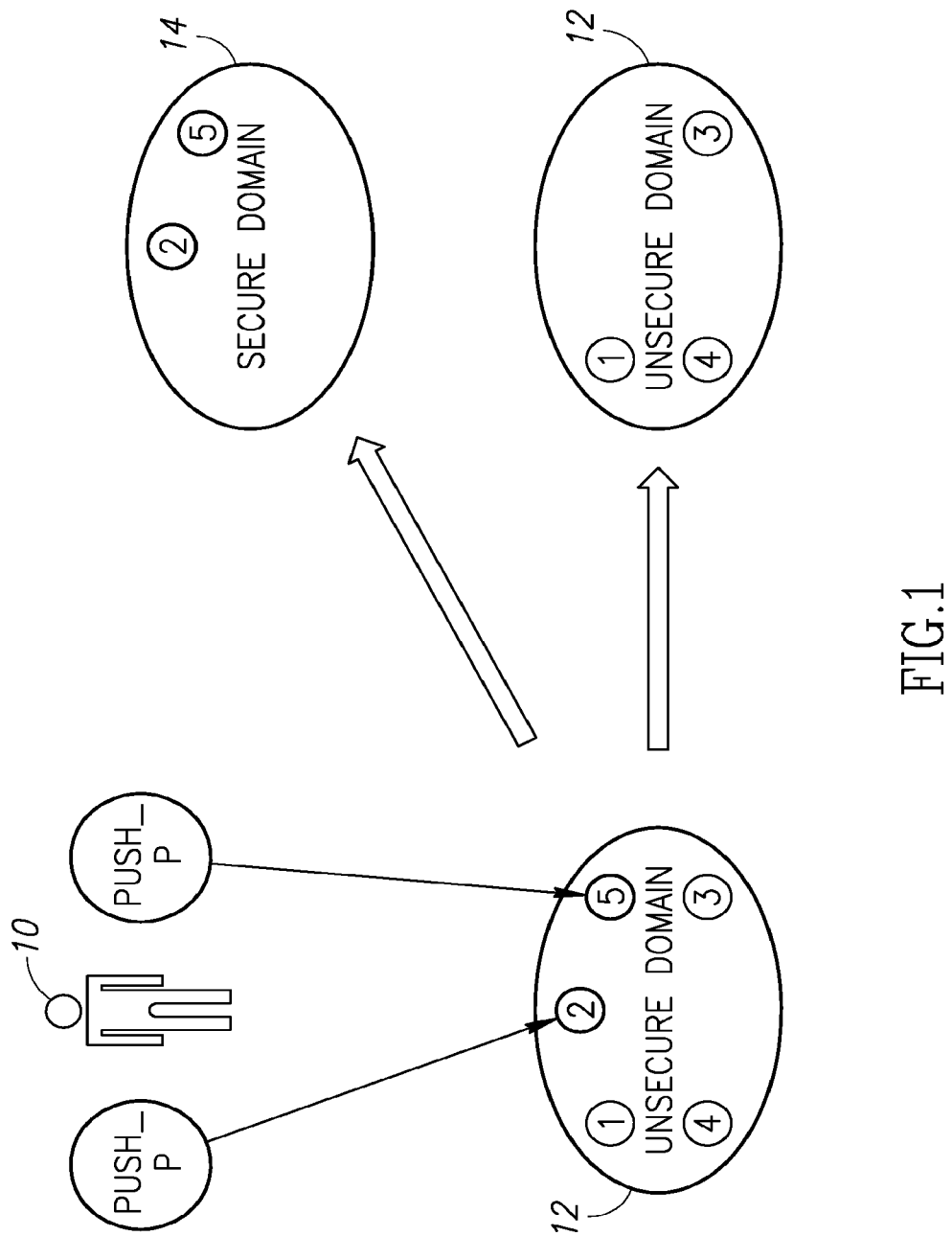
FIGS. 1 and 2 are schematic illustrations of prior art processes for converting a non-secure domain to a secure domain.
Figure 2:
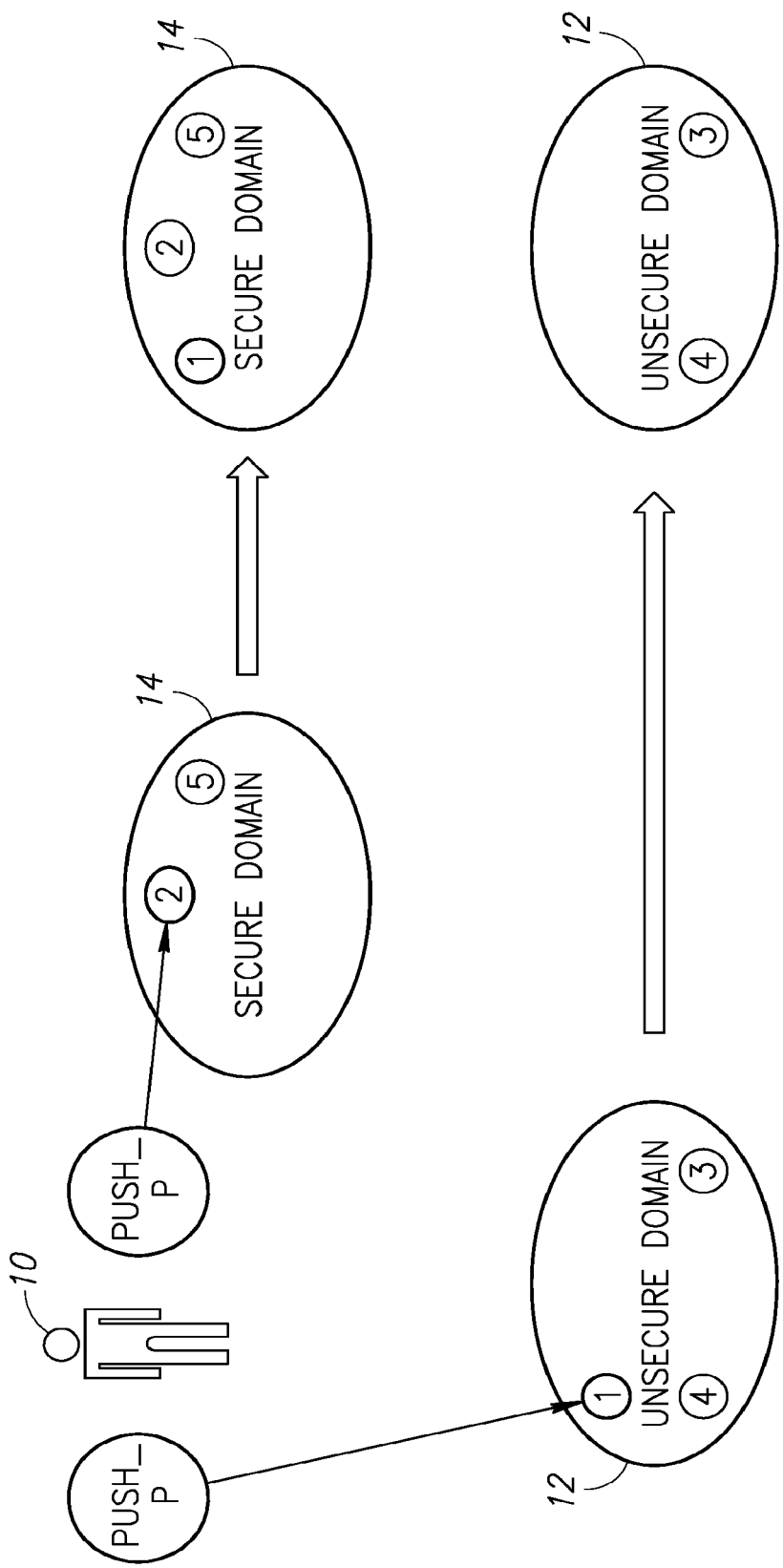

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that, when a pushbutton is used for pairing, the node which has been pushed receives no information as to whether it is to join a domain as an endpoint, or to try to become the domain master. Moreover, the node does not receive information about the state of the other node also receiving a button press and, as a result, the first node does not know how to join.

Applicants have further realized that enabling both nodes receiving the button press to alternate between both roles (endpoint and domain master) enables the nodes to receive the necessary information. Moreover, enabling any two pairing endpoints to switch between being a temporary master and being an endpoint ensures that a variety of possible scenarios of pushing of the pairing buttons can be handled. Once the nodes have been successfully paired, the two paired nodes finalize their status, one as an endpoint and the second as a domain master of a secure network.

Figure 3A:
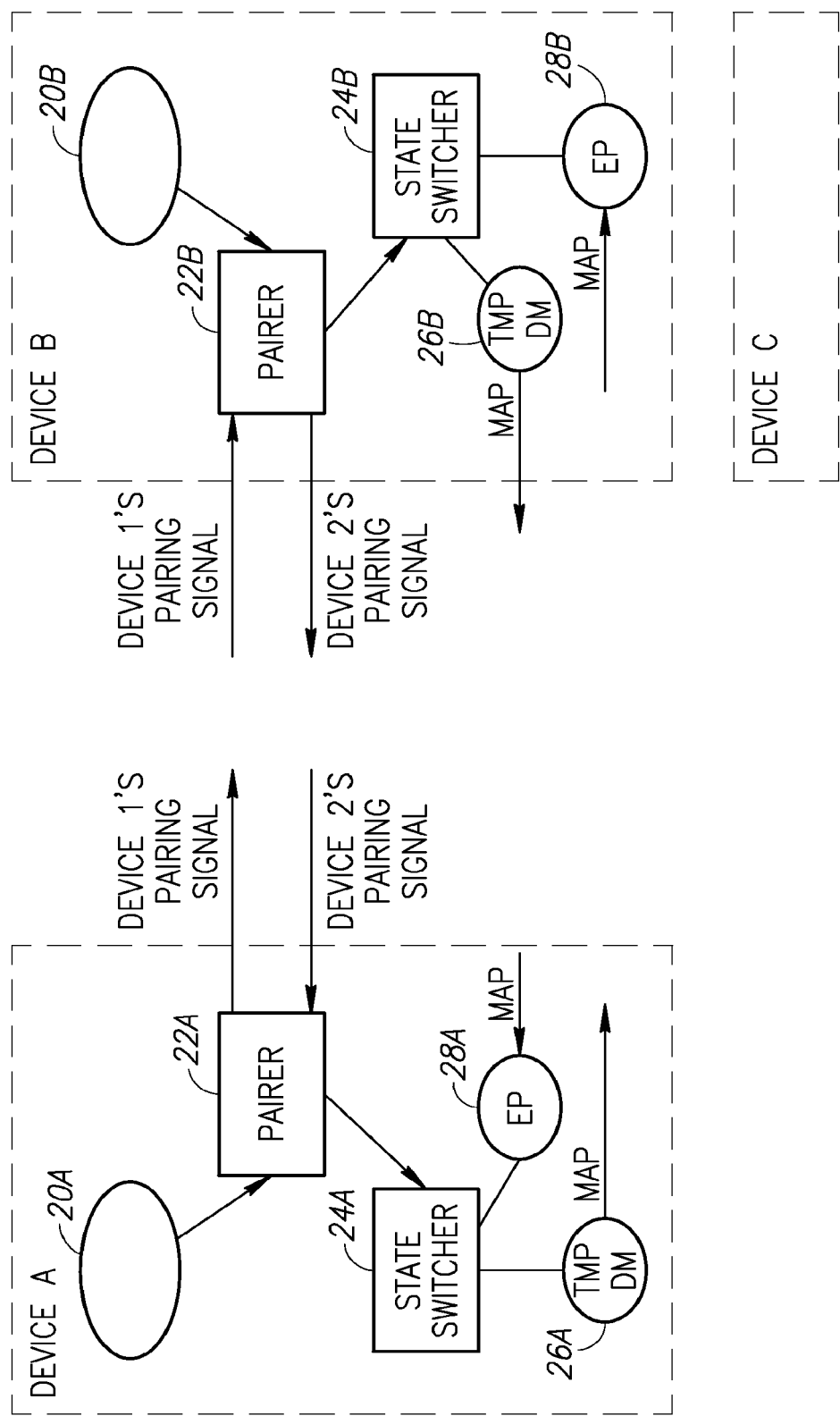
FIG. 3A is block diagram illustration of three network nodes, constructed and operative in accordance with a preferred embodiment of the present invention.
Figure 3B:
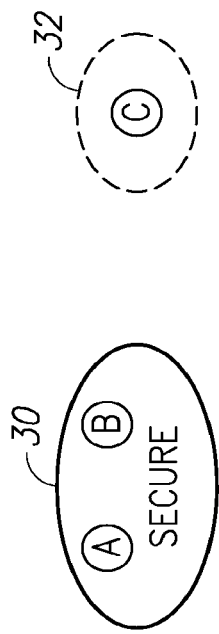
FIG. 3B is a schematic illustration of a secure and a non-secure network of the nodes of FIG. 3A.

Reference is now made to FIG. 3A, which illustrates three network nodes and their elements which handle the pairing process, and to FIG. 3B which illustrates exemplary networks that they may produce. It will be appreciated that, for clarity, only three nodes are shown; most networks will have a plurality of nodes. However, it will be appreciated that the present invention may enable a single pairing procedure, via a button press, to convert a non-secure domain to a secure domain or to add a node from a non-secure domain to a secure domain, for all possible use cases.

In the embodiment of FIGS. 3A and 3B, each node A, B and C may comprise a pushbutton 20 to provide a button press, Push_P, signal which starts the pairing process, a pairer 22 to perform the pairing process according to the method described hereinbelow and a state switcher 24, to switch the node to alternate between acting as a temporary domain master (indicated by 26) and acting as an endpoint node (indicating by 28) until pairing is complete.

To create a secure domain, the user may trigger the conversion of a non-secure domain to a secure domain by pressing pushbutton 20 on each of two nodes of the initially non-secure domain, wherein the pressing the second button takes place within a predefined time window from pressing the first button. This predefined time window is referred to as a pairing window $T_{PAIRING}$. Pressing pushbutton 20 may create a "PUSH_P Event" to pairer 22 and may activate pairer 22 to start the pairing window $T_{PAIRING}$. During the pairing procedure, one of the two pairing nodes may become the domain master (DM) of a newly established secure domain 30 (FIG. 3B), while the other may register with this domain master and become an endpoint (EP) in this newly established secure domain, as described in more detail hereinbelow.

In order to add another node, such as node C, to the existing secure domain of nodes A and B, the user may press pushbutton 20 of node C and pushbutton 20 of one of the nodes (A or B) from the secure domain.

Applicants have realized that when a pairer 22 of a node, which is not in a secure domain, detects a PUSH_P event, the pairer does not receive information about the state of the other node also receiving a button press and, as a result, the pairer does not know how to join. Therefore, in accordance with a preferred embodiment of the present invention, upon detection of the PUSH_P event, pairer 22, such as pairer 22B of node B, may initially attempt to pair with any detected secure domain for a predefined length of time. After this time expires, pairer 22B may activate state switcher 24B to switch node B to temporarily operate as a temporary domain master (TMP DM) 26B of a new temporary secure domain 32 (FIG. 3B) that it establishes.

In order to establish temporary secure domain 32, domain master 26B may randomize a non-default domain name (NDDN) and may transmit media access plans (MAPs) on the network medium (which may be any suitable type of medium, such as powerline), to enable any potential node to pair with it.

In accordance with a preferred embodiment of the present invention, state switcher 24B may periodically switch the state of node B from acting as domain master 26B to acting as endpoint 28B. As endpoint 28B, node B may scan for MAPs of other secure domains and may try to pair with any detected other secure domain master as a registering endpoint node, as described in detail hereinbelow. This alternation may continue until successful completion of the pairing procedure or expiration of pairing window, $T_{PAIRING}$.

In accordance with a preferred embodiment of the present invention, both nodes that are being paired may perform this alternation. Thus, if the two pairing nodes are nodes A and B, state switcher 24B may periodically alternate the state of node B while state switcher 24A may periodically alternate the state of node A.

Figure 4:
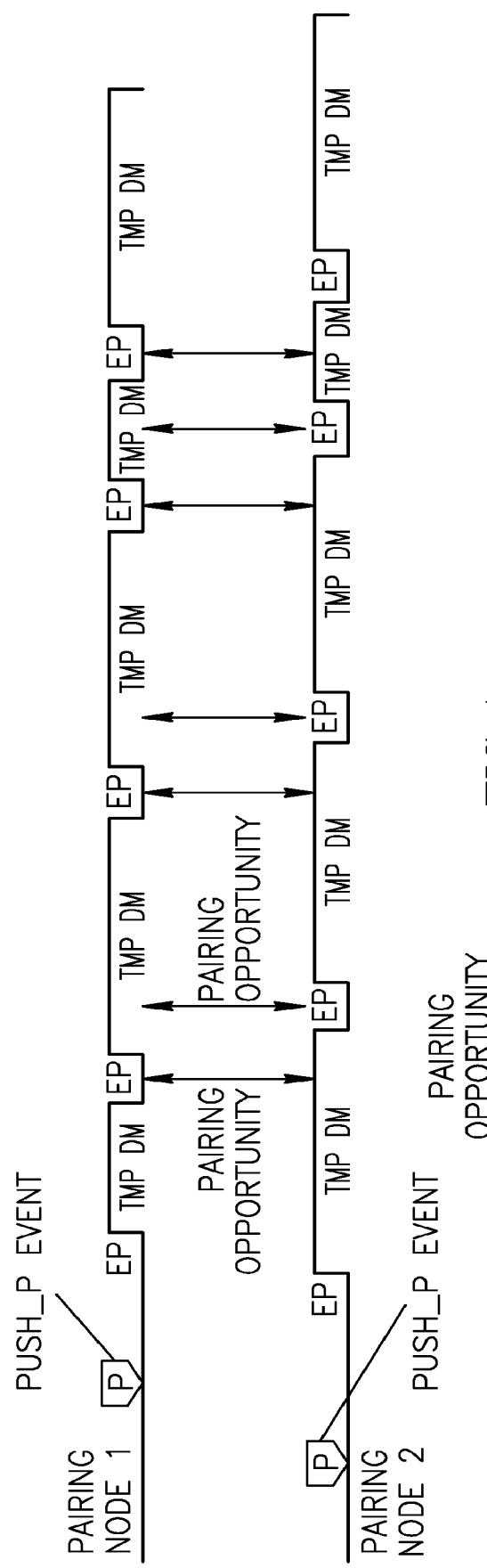
FIG. 4 is a timing diagram illustration of the operation of the network nodes of FIG. 3A during a pairing process.

In order to ensure that, during the time that one of the two pairing nodes (e.g. node B and node A) is acting as a temporary domain master, the other node may be acting as a registering endpoint, the timing scheme shown in FIG. 4, to which reference is now made, may be used.

FIG. 4 is a timing diagram for two pairing nodes. It shows two separate button presses, denoted Push_P events, for the two nodes. After each Push_P event, each node acts as an endpoint (EP) for a first period of time, after which each node switches to be a temporary domain master (TMP DM). Each node continually switches between the two states, where the period as a temporary domain master may be longer than the period as an endpoint (for all endpoint periods after the first one). For example, the TMP DM period may be a randomized value, such as between 1 and 4 seconds or any other predefined range of time, while the EP period (after the first one) may be fixed at 1 second, or any other predefined length of time. Alternatively, the EP period may be within a randomized range of times, as long as the range is shorter than the TMP DM period. The example in FIG. 4 shows TMP DM periods of different lengths and EP periods are of the same length.

This way, when one node is in the EP mode and the other node is in the TMP DM mode, there is a "pairing opportunity", as noted by the arrows in the figure. At each pairing opportunity, each registering EP node may detect the temporary domain master TMP DM. The following two conditions, when put together, ensure that enough pairing opportunities occur: 1) the EP period is shorter than the TMP DM period, and 2) the TMP DM times of the two nodes are different. The second condition is achieved (with reasonable probability) by randomizing the TMP DM periods.

Figure 5:
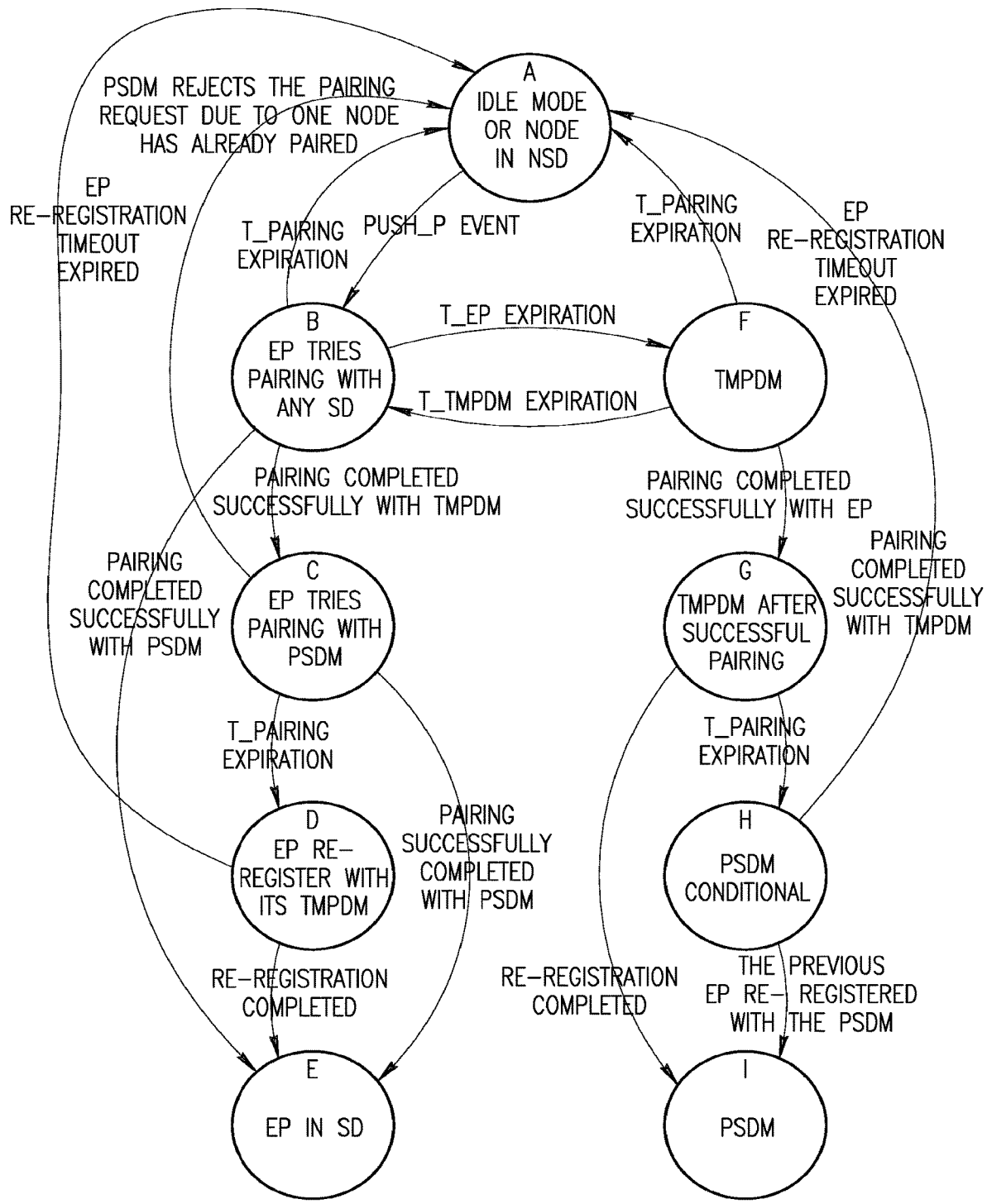
FIG. 5 is a state machine illustration of the operations of the nodes of FIG. 3A during pairing.

Reference is now made to FIG. 5, which illustrates a state machine of a node after a user has pushed its pushbutton 20, triggering a PUSH_P event in single pairing mode.

There are 9 states, A-I. States A-E are the endpoint states while states F-I are the domain master states.

State A is the initial state, before attempting to join a secure domain. The node is either already functioning as a member of a non-secure domain or is configured to only operate in a secure domain and is thus, in an idle mode, waiting for the Push_P event.

State B is the state where the endpoint tries to pair with any secure domain master (temporary or permanent). State C is the state where the endpoint tries to pair only with a permanent secure domain master. In state D, the endpoint tries to re-register with a temporary domain master TMPDM. State E is the final state, where the endpoint is in the secure domain.

State F is the temporary domain master (TMP DM) state. State G is the state when the temporary domain master has successfully paired with an endpoint. State H is the state when the temporary domain master has converted to a conditional permanent domain master and State I is the state of the temporary domain master that is converted to a permanent domain master of a secure domain.

As mentioned hereinabove, the state machine starts in state A, where the node is in idle mode or is an EP in a non-secure domain. After a PUSH_P event, the node changes its state to state B (EP tries pairing with any SD).

Figure 6:
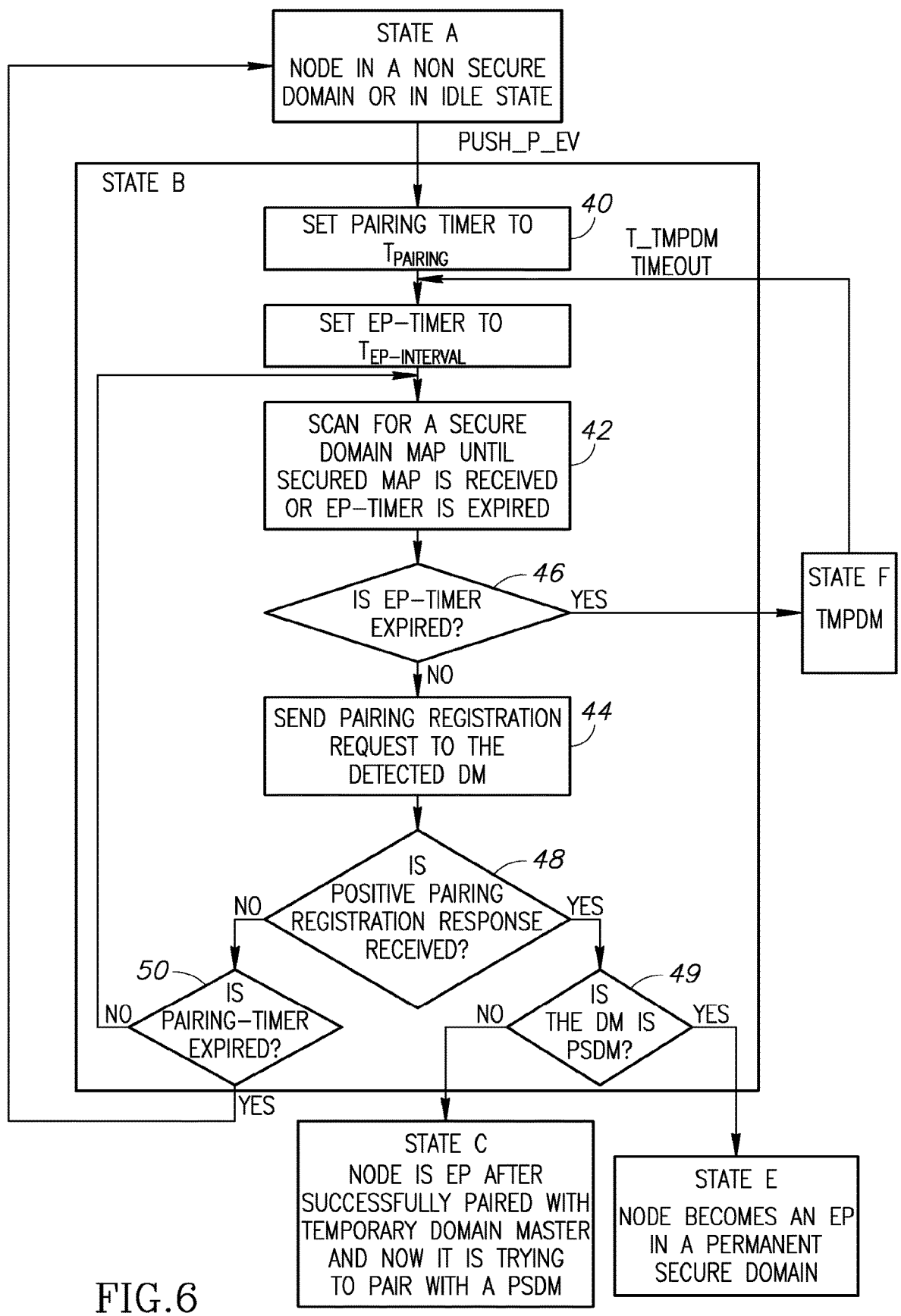
FIGS. 6, 7, 8, 9 and 10 are flow chart illustrations of the operations of the nodes for states B, C, F, H and I of FIG. 5.

In state B, whose flow chart is shown in FIG. 6 to which reference is also made, pairer 22, as an endpoint, may set (step 40) a PAIRING timer, to count the $T_{PAIRING}$ period, and an EP-Timer, to count the EP period, and may then scan (step 42) for any secure domain for a T_EP interval (e.g. 1 second). If it detects a secure domain master, it may try to pair (step 44) with the domain master of the secure domain. One of the following 4 events may transit the node from this state:

1. T_EP Expiration (checked in step 46). This happens when the T_EP interval has expired. Upon this event, state switcher 24 may switch the endpoint to start acting as a temporary domain master in state F (TMPDM).

2. Pairing completed successfully with TMPDM (checked in steps 48/49). This happens when the endpoint node has successfully completed the pairing procedure with a temporary domain master. This event may transit the EP to state C (EP tries pairing with permanent secure domain master (PSDM)).

3. Pairing completed successfully with PSDM (checked in steps 48/49). The EP successfully completed the pairing procedure with a permanent secure domain master (PSDM). This event transits the EP to the final state, state E (EP in the secure domain SD).

4. T_PAIRING Expiration (checked in steps 50). The PAIRING timer, which counts the pairing window, has expired, indicating that the pairing procedure has ended without any successful pairing. This event transits the EP to state A, the state before the PUSH_P event.

Figure 7:
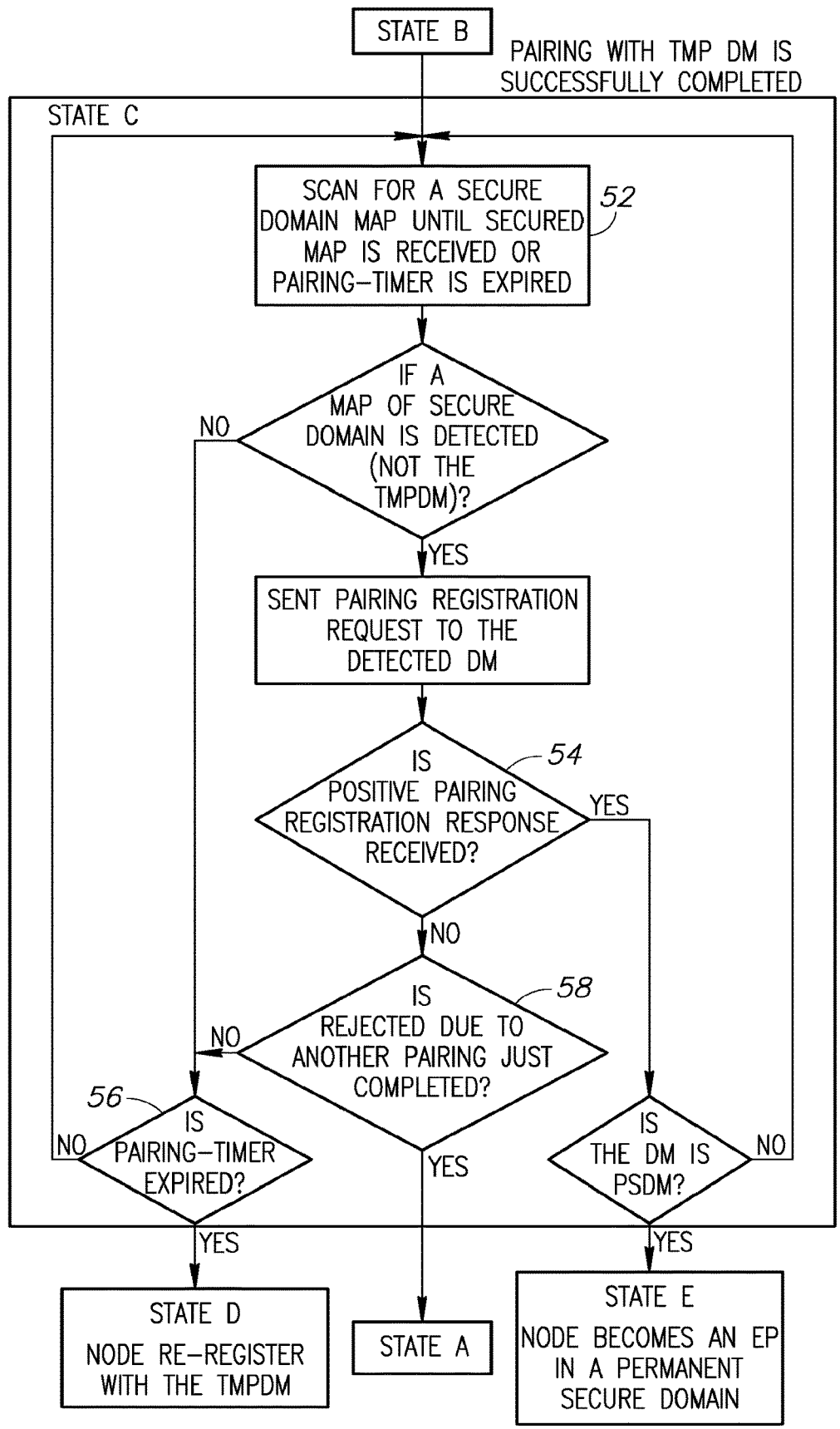

In state C of FIG. 5, whose flow chart is shown in FIG. 7 to which reference is now made, the endpoint EP tries pairing only with a permanent secure domain master PSDM. In this state, the EP is already paired with the temporary DM and is acting as a normal registered node. However, Applicants have realized that the temporary domain master might not be the desired domain master because there may already be a permanent secure domain master of a previously existing secure domain. Therefore, in this state, its pairer 22 may scan (step 52) for a secure domain, to try to pair with any detected permanent secure domain master (PSDM). Endpoint EP may transit from this state to another state upon one of the following 3 events:

1. Pairing completed successfully with PSDM (as checked in step 54). The endpoint successfully completed the pairing procedure with a Permanent Secure Domain Master. This event transits the EP to the final state E (EP in SD).

2. T_PAIRING Expiration (as checked in step 56). The PAIRING timer, which counts the pairing window, has expired. This event transits the EP to state D (EP tries to re-register with temporary domain master TMPDM).

3. PSDM rejected the pairing because it just paired to another node (as checked in step 58). The responding PSDM may reject the pairing request because it just closed its pairing window having successfully completed the pairing procedure with another node. (A PSDM shall send this rejection when it receives a pairing request within the last pairing period $T_{PAIRING}$ but after it has already paired successfully with another node). The endpoint EP shall return to the initial state A at this point.

In state D, the EP node may try to re-register with its original temporary domain master TMPDM (with which it paired in state B). The node may transit from state D upon one of the following 2 events:

1. The EP re-registered successfully with its TMPDM—this event shall transit the EP to the final state E.

2. The EP failed to re-register with its TMPDM—The EP tries to re-register with its TMPDM but the period has expired (such as if the TMPDM is off). This event shall abort the pairing procedure and transit the EP to initial state A.

State E of FIG. 5, EP in SD, is one of the two final states for FIG. 5 (the second final state is I). In state E, the node has finally completed the pairing procedure and becomes a legitimate member of secure domain 30. In this state, it starts an authentication procedure, such as that forming part of the ITU G.0061 standard.

Figure 8:
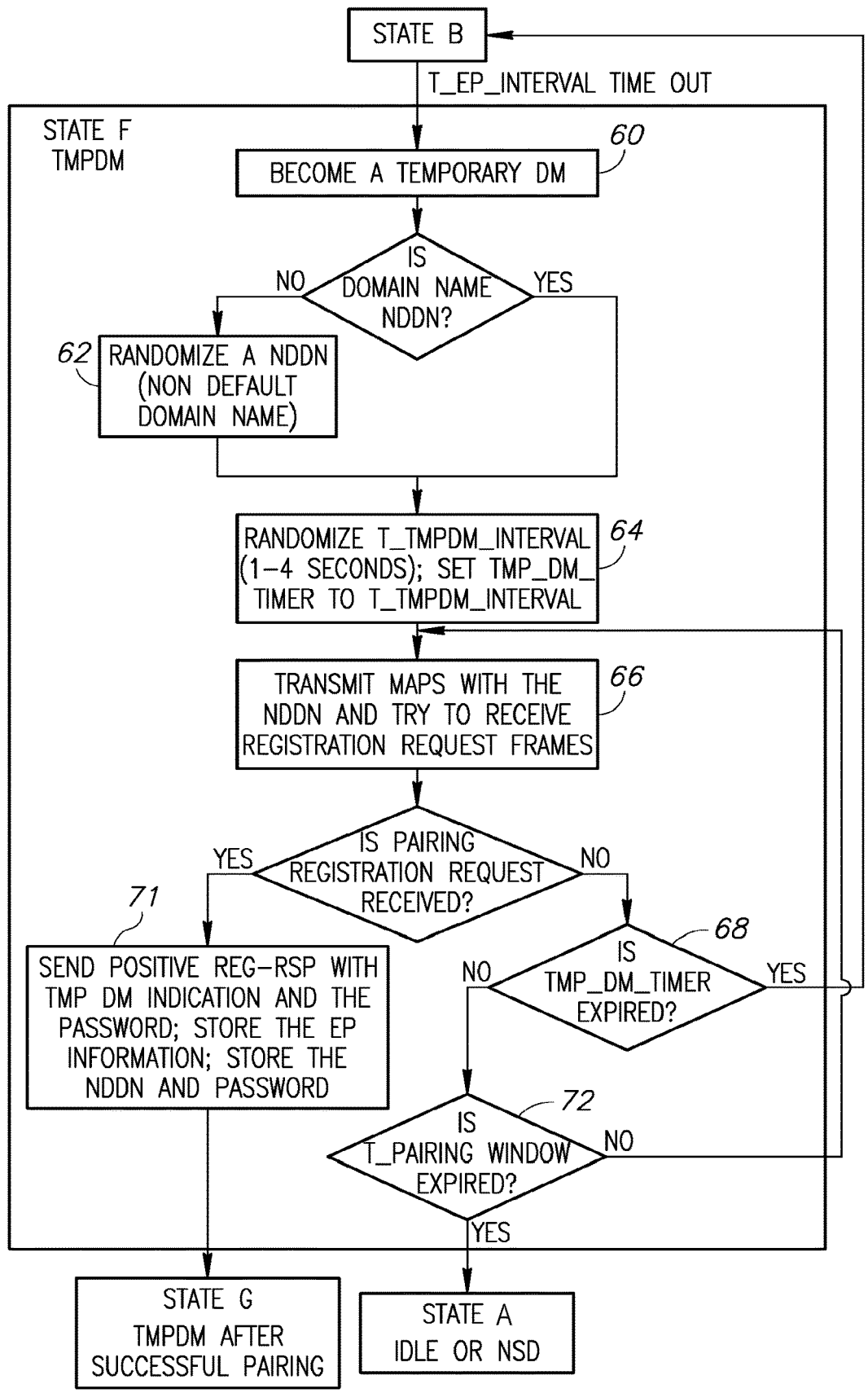

In state F of FIG. 5, whose flow chart is shown in FIG. 8 to which reference is now made, state switcher 24 may switch the node to become (step 60) temporary domain master TMPDM for an interval TMP_Interval. The first time that the EP transitions to this state, domain master 26 may generate (step 62) a random domain name and a password for the temporary domain master TMPDM. It may then determine (step 64) the current temporary domain master interval via a randomizing operation.

As the temporary domain master, domain master 26 may transmit (step 66) MAPs with the random domain name and may try to receive registration request frames. One of the following 3 events may transit the node from this state:

1. T_TMPDM Expiration (as checked in step 68). The temporary domain master interval has expired. Upon this event, state switcher 24 may switch the node to act as an endpoint node in state B (EP tries pairing with any SD).

2. Pairing completed successfully with EP (as checked in step 70). An endpoint node has successfully completed the pairing procedure with this temporary domain master. In step 71, pairer 22 may send a positive registration response with an indication of the TMP DM and its password and may store the EP's information. It may also store its current domain name and password. The successful pairing may transit the temporary domain master to state G (TMPDM after successful pairing).

3. T_PAIRING Expiration (as checked in step 72). When the PAIRING timer, which counts that the pairing window has expired, pairer 22 may abort the pairing procedure and may transit the node to the initial state A.

Figure 9:
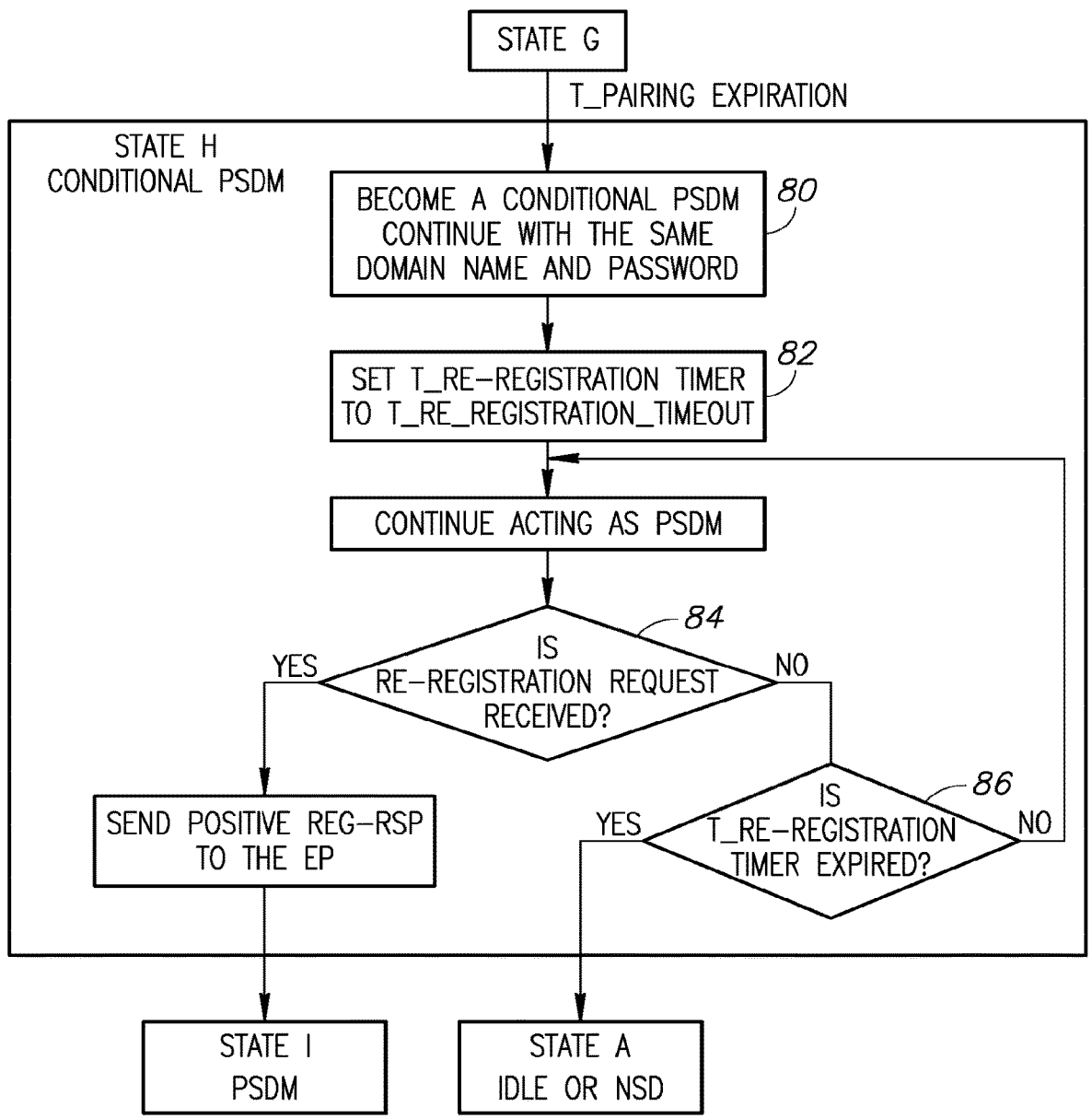

State G (TMPDM after successful pairing). The temporary domain master may continue to act as a temporary DM in state G until its $T_{PAIRING}$ interval expires, at which point, it transits to state H (conditional PSDM), whose flow chart is shown in FIG. 9 to which reference is now made. State G is generally useful to put the TMPDM in a wait state to enable the EP that paired with it and which is in its state C, to try to pair with a different PSDM. If, during its state C, the EP did not successfully pair with a PSDM, the EP shall re-register (in its state D) with the TMPDM while the TMPDM is in state H. If the EP re-registers with the TMPDM while TMPDM is in state G, then the TMPDM may change its state to I and skip state H. One of the following 2 events may transit the node from this state:

1. T_PAIRING expired. This event transits the TMPDM to state H.

2. Re-Registration request from its EP. This event transits the TMPDM to state I.

State H (conditional PSDM). The conditional permanent secure domain master might be a permanent secure domain master depending on whether or not the EP that successfully paired with it in state E has not meanwhile paired with another PSDM. In this state and as shown in FIG. 9 to which reference is now made, the conditional PSDM may continue (step 80) with its current domain name and password (generated in state E) and may set (step 82) a re-registration timer T_Re_Register to wait for a re-registration event from its endpoint. The re-registration timer T_Re_Register may be a function of the time of the pairing procedure that executed in state E as follows:

$$T\_Re\_Register = T\_PAIRING - (Pairing\_t - Start\_window\_t) + 1 \text{ second}$$

where Pairing_t is the time where the pairing procedure with the EP was started and Start_window_t is the time where the node was triggered with the PUSH_P event.

The following events shall transit the node from this state:

1. The EP re-registered with the PSDM (as checked in step 84). If the previously registered EP successfully completed a re-registration procedure, then the EP has completed its pairing procedure and thus, state switcher 24 may convert the conditional permanent domain master to a permanent secure DM (PSDM), thereby transiting to final state I (PSDM).

2. T_Re_Registration Expiration (as checked in step 86). This event occurs when the timer for re-registration of the EP with the conditional PSDM has expired. This can happen, for example, if the EP has successfully paired with the actual PSDM. If the timer has expired, pairer 22 transits the node to initial state A.

3. State I (PSDM). In this, final, state, the conditional PSDM becomes a permanent secure domain master. In this state, the PSDM shall use the domain name and password that it used in states E and G.

It will be appreciated that a node that starts a pairing procedure shall complete it in one of the following possible states:

The node successfully joins a secure domain as an end point node (state E); or

The node, as a temporary domain master, becomes a permanent secure domain master (state I).

If the pairing window expires without any successfully completion of the pairing procedure, the triggered node returns to the initial state (state A).

A permanent secure domain master (PSDM) shall operate after PUSH_P Event as defined in the following algorithm.

Figure 10:
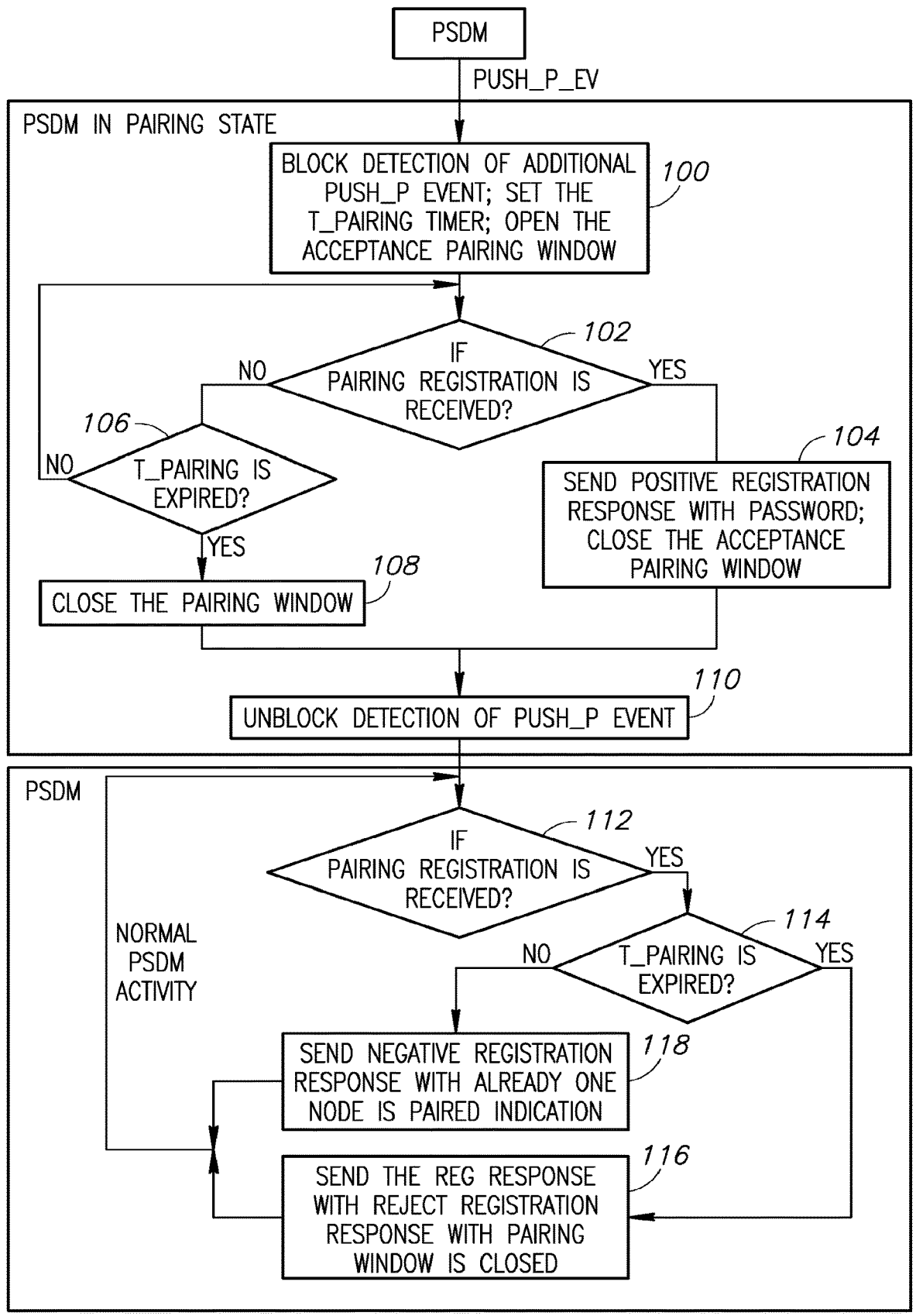

Reference is now made to FIG. 10, which illustrates the actions a permanent secure domain master PSDM may take during a pairing procedure.

After a Push_P event at the PSDM, or transmitted by other nodes in the secure domain, the PSDM may begin the pairing operation. Since it may only pair with one node at a time, it may block (step 100) detection of other Push_P events while it attempts to pair. In step 100, it may also set up the T_Pairing timer as well as open a pairing window.

If the pairing is successful, as checked in step 102, it may send (step 104) a positive registration response with the password for the domain and may close the pairing window. Otherwise, it may wait for the pairing window to close (steps 106 and 108).

Once the pairing window has closed, the PSDM may unblock (step 110) detection of Push_P events. If another pairing registration request is received (as checked in step 112) and the pairing timer T_Pairing has closed (as checked in step 114), it may send (step 116) a "pairing window closed" response. Otherwise, if the pairing timer is still running, it may send (step 118) an "already paired" response.

It will be appreciated that the present invention enables successful pairing via push-buttons in the many situations that a user may activate.

Figure 11:
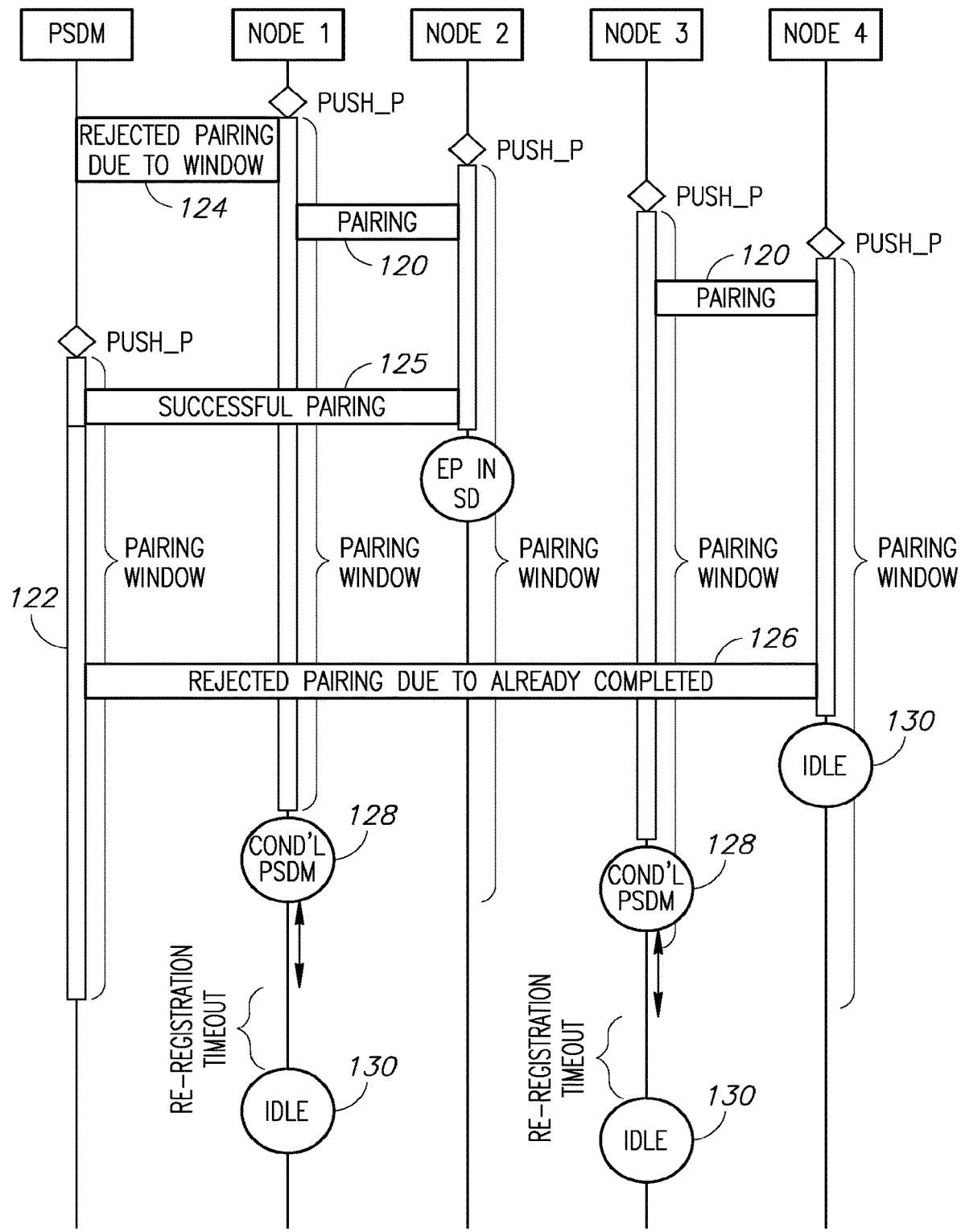
FIG. 11 is a timing diagram illustration of how the present invention operates when a user incorrectly pushes the push-buttons of multiple idle nodes belonging to a non-secure domain as well as the push-button of the domain master of a secure domain.

Reference is now made to FIG. 11, which illustrates an example of how the present invention operates when a user incorrectly pushes 4 idle nodes from a non-secure domain as well as on the domain master of a secure domain. The pairing mechanism described above solves this faulty use case and resolves it by having the domain master pair only with one of the 4 nodes. The rest of the nodes return to the idle state.

The user pushes buttons 20 of the 4 nodes (causes Push_P events) in order and then pushes pushbutton 20 of the PSDM. As can be seen, pairing, labeled 120, can occur between nodes 1 and 2 and between nodes 3 and 4 before the user even pushes pushbutton 20 on the PSDM. The PSDM opens a pairing window 122 after its Push_P event. Before that, it will reject (line 124) any pairing requests.

The first pairing request received while its pairing window 122 is open, shown from node 2, will be accepted and pairing will occur. Thus, node 2 and the PSDM have successfully paired (line 125). However, the PSDM will reject pairing requests from the other nodes, such as pairing request 126 from node 4. As a result, node 4 returns to the idle state (at 130).

Node 1 and node 3, which weren't paired with the PSDM, convert (at 128) to conditional PSDMs after their pairing windows close, but after their re-registration timeouts end with no re-registration from their previously paired endpoints, they return to the idle state (at 130).

In accordance with a preferred embodiment of the present invention, a node that is attempting to join a secure domain may send an ADM_NodeRegistrRequest.req message to a detected secure domain master. The ADM_NodeRegistrRequest.req message may include a pairing indication, in addition to any other parameters necessary for registration.

Upon receiving the ADM_NodeRegistrRequest.req message, the domain master may process the registration request and may reply within REG_RESP_TIME to the node with an ADM_DmRegistrResponse.cnf message. If the domain master receives the registering request message while it was within a pairing window, the ADM_DmRegistrResponse.cnf message may include the following fields:

1. A status flag with a success registration indication,
2. A password needed for the authentication procedure (e.g. ref [ITU G.9961] clause 9.2),
3. A non-zero DEVICE_ID for the registering node assigned by the domain master,
4. All other relevant configuration data, such as those as defined in ITU G.9961.

Upon receiving the ADM_DmRegistrResponse.cnf message, the registering node may identify the ADM_DmRegistrResponse.cnf message based on its REGID field and may adopt the Domain Name of the domain that replied positively and its new assigned DEVICE_ID. The registering node may use the password included in the ADM_DmRegistrResponse.cnf message for the authentication procedure.

If the registration request was not received within an open pairing window, the domain master may reject the registration request by replying to the registering node with a ADM_DmRegistrResponse.cnf message that contains the status flag set to zero and an extended rejection code that indicates that the registration request is rejected due to "pairing window is closed".

If the registration request was received within an open pairing window, but after another successful pairing, then the domain master may reject the registration request by replying to the registering node with a ADM_DmRegistrResponse.cnf message that contains the status flag set to zero and an extended rejection code that indicates that the registration request is rejected due to "pairing just has been completed successfully with another node".

In case of rejection, the DEVICE_ID may be set to zero.

If the registering node does not receive an ADM_DmRegistrResponse.cnf message from the domain master within one second, the node may retry registration within REG_RETRY_TIMEOUT. If the registering node does not receive a response after MAX_REG_ATTEMPTS registration attempts, the node may scan and try to detect another domain master.

If the registering node was rejected by the domain master, due to a closed pairing window, the node may scan and try to detect another domain master. The node may continue to retry registration with all the detected secure domain masters during $T_{PAIRING}$ (REG_PAIRING_WINDOW) seconds. If the node did not receive positive registration response after the REG_PAIRING_WINDOW period is expired, it may return to its state before the PUSH_P Event was detected.

In accordance with a preferred embodiment of the present invention, the user may trigger the PUSH_P Event on the joining node and on any arbitrary node in a secure domain in order to start the pairing mechanism. Upon detecting the PUSH_P event, the triggered EP node in the secure domain may send an ADM_NodeReportPUSH_P.ind message to its domain master to report about the PUSH_P event. Upon receiving the ADM_NodeReportPUSH_P.ind message, the domain master may respond with the ADM_NodeReportPUSH_P.rsp message to the EP node, to confirm receiving the ADM_NodeReportPUSH_P.ind message, and may immediately open the pairing window to accept a potential registering node with a pairing request.

Figure 12:
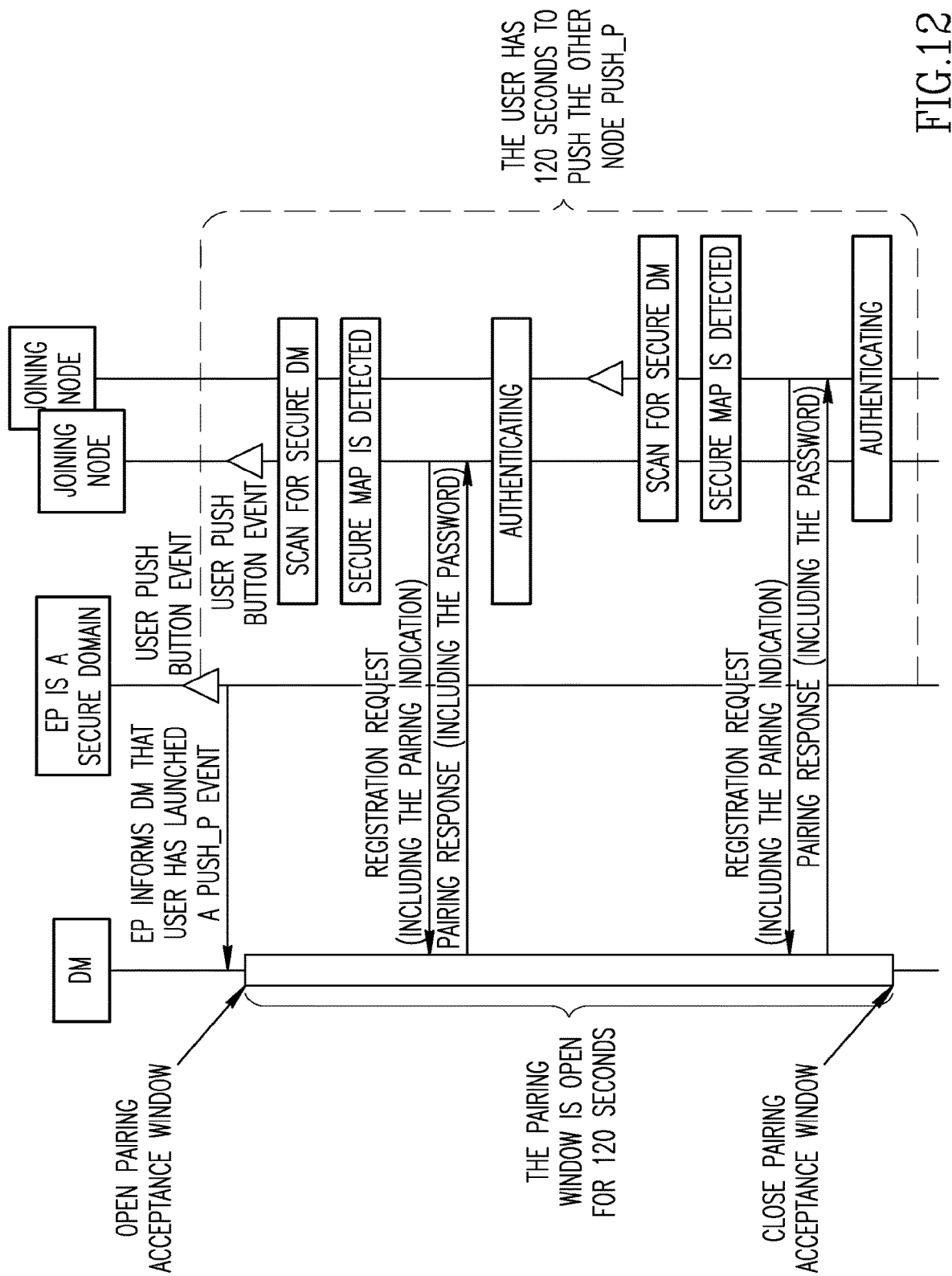
FIG. 12 is a timing diagram illustration of adding multiple non-secure nodes to a secure domain during a single pairing window, in accordance with an alternative preferred embodiment of the present invention.

In accordance with a preferred embodiment of the present invention, nodes may be configured to enable pairing of single nodes or of multiple nodes. In the multi-pairing configuration, a user may add multiple non-secure nodes to a secure domain at one time, as long as the secure domain already includes one secure endpoint within it. This is shown in FIG. 12, to which reference is now made.

In this embodiment, the pairing registration procedure is similar to that of the single pairing mode discussed hereinabove, except that the domain master may wait to close the pairing acceptance window until the window period of the REG_PAIRING_WINDOW has expired. This enables several nodes to register within one REG_PAIRING_WINDOW period. In the example of FIG. 12, the user pushed on one of the secure nodes of the secure domain (labeled EP), which subsequently informed its domain master about the PUSH_P event. After that, the user pushed pushbutton 20 on two other joining nodes, during the pairing window, which may be, for example, 120 seconds long. Both joining nodes scan for and detect a secure MAP and then attempt to register with the PSDM, which sends a pairing response within the pairing window. The window closes shortly afterwards.

During the REG_PAIRING_WINDOW period, the domain master may block any other PUSH_P events from other secure endpoints.

Figure 13:
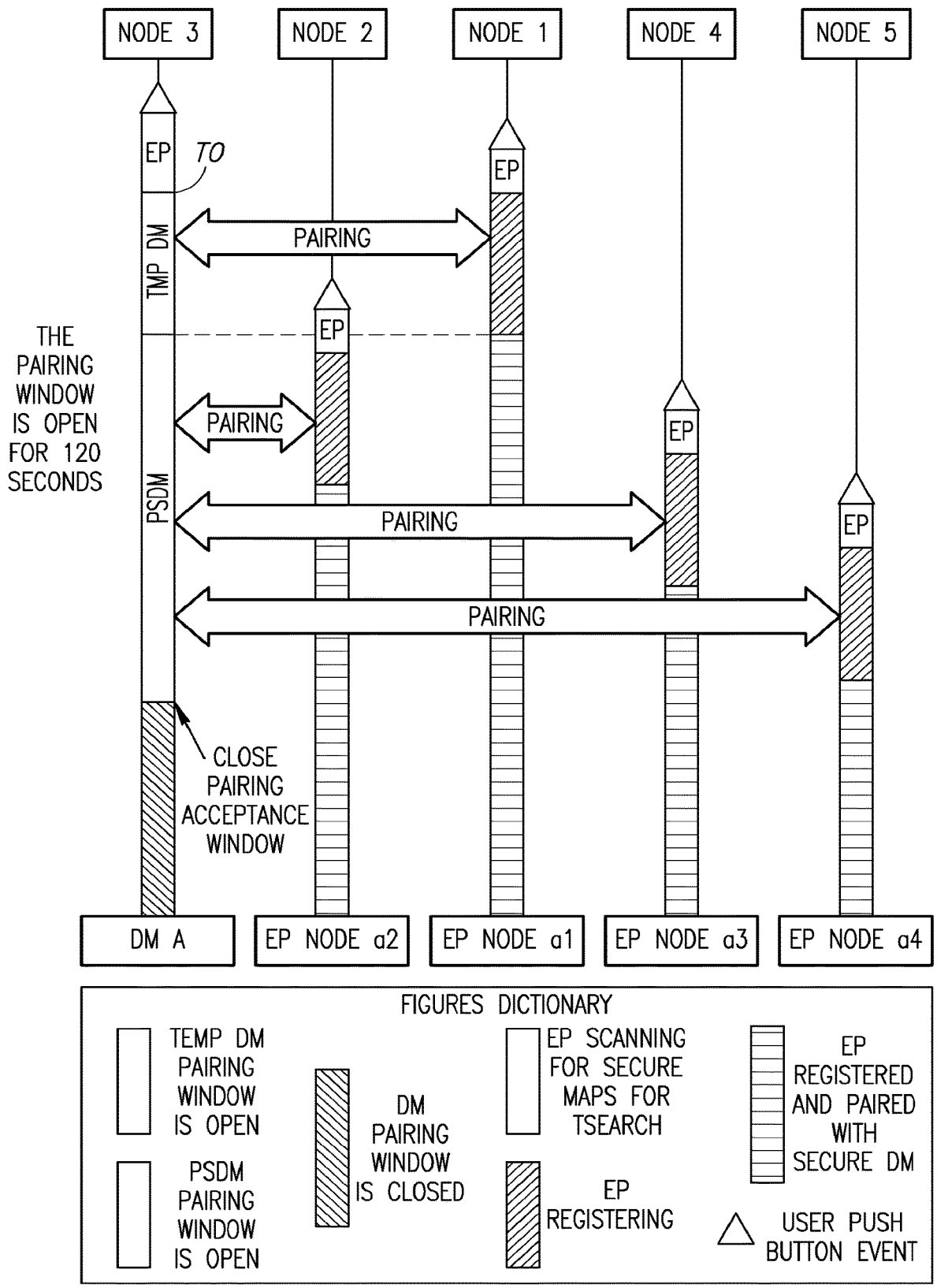
FIG. 13 is a timing diagram illustration of converting an entire non-secure domain to a secure domain within a single pairing window, in accordance with an alternative preferred embodiment of the present invention.

The multi pairing mode of the present invention may also be utilized to enable the user to convert an entire non-secure domain to a secure domain, by pushing button presses 20 on all of the non-secure nodes of the domain, within a single pairing window. This is illustrated in FIG. 13, to which reference is now made.

In the illustrated example, node 3 is the first node that is triggered by the PUSH_P event from the user's press of pushbutton 20. As a result, node 3 may start scanning for a secure domain. After T0, it becomes a temporary domain master of new secure domain (DM A). Node 1 is the second node that is triggered with the PUSH_P event and may start scanning for a secure domain. When node 1 detects the MAPs transmitted by temporary DM A (i.e. node 3), node 1 registers with DM A and, after completion of the registration procedure, node 1 becomes an EP node in domain A (as node a1).

Node 2 is the 3rd node that is triggered with the PUSH_P event. It follows the same process that node 1 followed and, after completion of the registration procedure, becomes an EP node in domain A (as node a2). Node 4 follows, to become node a3, and finally, node 5 is triggered with the PUSH_P event and becomes node a4. Successful completion of the multi-pairing procedure results in a new secure domain A with node 3 as the domain master.

It is possible that the multi pairing procedure may create more than one secure domain. This can happen because, during the pairing open window, more than one node might become a temporary domain master, with a unique random domain name. Some of the multiple nodes may register with one temporary domain master while others of the nodes may register with a different temporary domain master.

In order to avoid the problem described in the above paragraphs, each temporary DM that completes successfully a registration procedure with one of its nodes does not immediately become a permanent domain master, as described hereinabove. Instead, each temporary domain master continues acting as a temporary domain master until the expiration of the current pairing window. If a temporary domain master or any of its nodes detects MAPs from other temporary domain masters during the current pairing window, the temporary domain master may merge its domain with the domain of the detected domain master, as described in FIG. 14, to which reference is now made.

Figure 14:
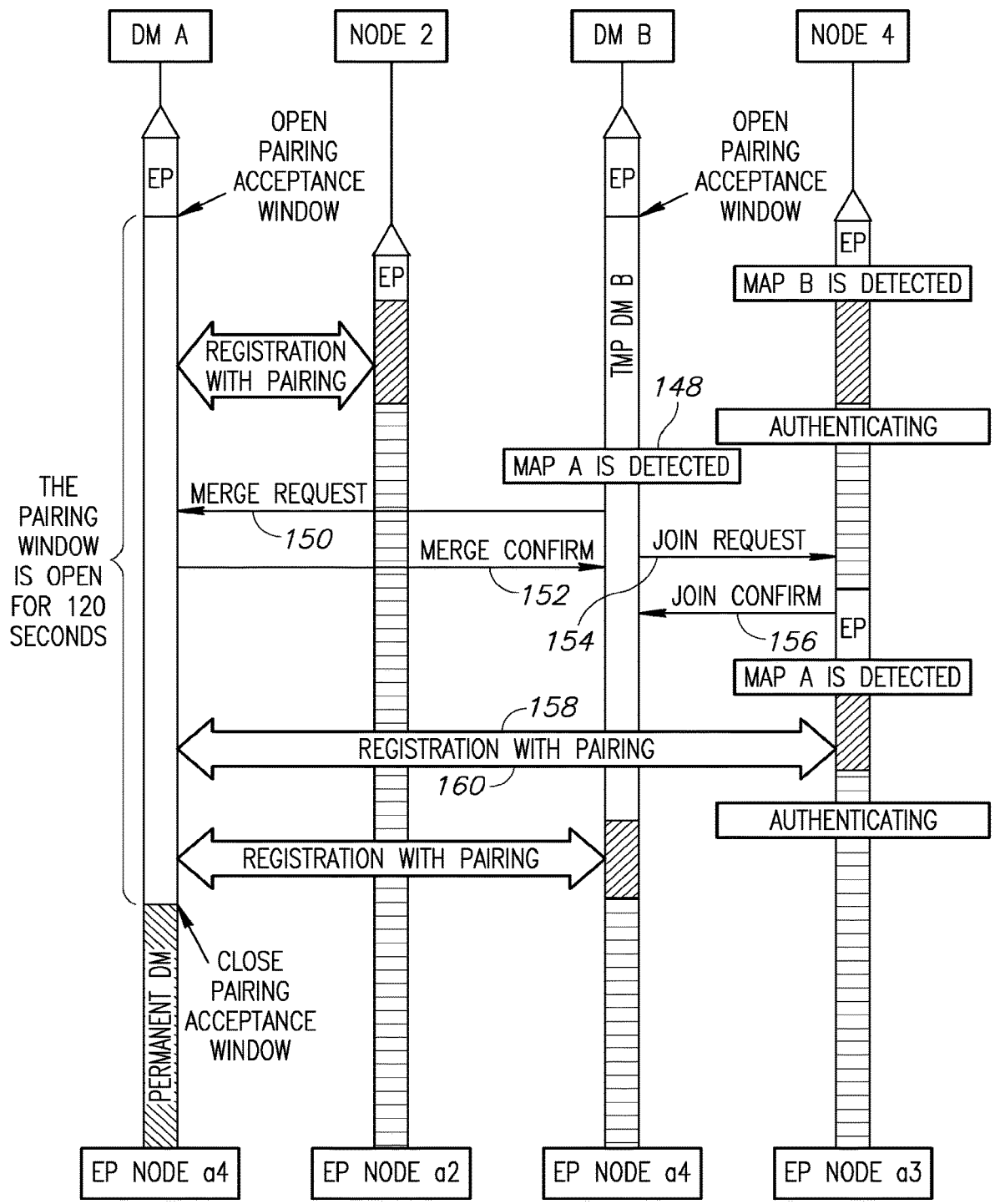
FIG. 14 is a timing diagram illustration of the merging of two temporary domains into a single domain.

FIG. 14 shows two temporary domain masters, DM A and DM B, both of which have one node (nodes 2 and 4, respectively) in their domain. Both domain masters are currently temporary domain masters with their pairing windows open.

When temporary domain master B detects a MAP 148 from temporary domain master A, temporary domain master B may send a merge request 150 to temporary domain master A, which, in this example, acts as a "target" temporary domain master. The merge request message may contain the list of all the nodes that belong to the requesting domain master (e.g. domain master B).

The target temporary domain master (domain master A) may respond with a positive merge confirm 152 due to the fact that its pairing window is still open. After receiving the positive merge confirm, the joining temporary domain master (domain master B) may send a join request message 154 to all its registered nodes (e.g. node 4) ordering them to register with the target temporary domain master (domain master A). The join request message 154 may contain the domain name of the target temporary domain master. All the nodes of the joining domain may send a join confirm 156 to the joining temporary domain master (domain master B) as well as a registration request 158 with the pairing indication to the target domain master (domain master A).

The target domain master may reply with a positive registration confirmation 160, which may be issued during or after the pairing window has closed because it has already received the list with the registering nodes from the joining domain master via merge request message 150.

Successful completion of the merge procedure creates one united secure domain, with domain master A as the permanent domain master.

If two domain masters simultaneously send a merge request to each other, only one of the merge procedures may be completed. One of the domain masters may abort its merge procedure. For example, the domain master that has a smaller reverse value of its MAC address may abort its own merge request. Typically, the merge procedure may be aborted only after receiving a merge confirmation to a merge request.

The pairing system of the present invention may enable many different pairing scenarios. The following table lists the use cases which can be performed with the present invention.

| Use Case | Description | Comments |
|---|---|---|
| 1A | Single pairing mode - Convert a non-secure domain to a secure domain | With push button mechanism, the user adds a node at a time in each pairing procedure |

-continued

| Use Case | Description | Comments |
|---|---|---|
| 1B | Single pairing mode - Convert a non-secure node that is in an idle state to a secure domain | Node 1 is configured to start in IDLE state and to be operational only in secure mode. |
| 2A | Single/multi-pairing mode - join a node from a non-secure domain to existing secure domain | Existing secure domain. Initial state can be EP or DM |
| 2B | Single/multi-pairing mode - join a node that is in idle state to existing secure domain | Existing secure domain. Initial state IDLE |
| 3 | Single/multi-pairing mode - A node that was already paired is switched off and switched on again | After power up, it shall join to the secure domain that it was a member of before the power off |
| 4 | Single/multi pairing mode. A node that is configured with empty default domain name (null string) | Shall be in IDLE state until Push_P event |
| 5 | Multi-pairing mode - a user pushes within a window pairing period on several nodes that do not belong to a secure domain | All the nodes that detect the Push_P event will establish a secure domain |
| 6 | Multi-pairing mode - a user pushes (within one pairing window) the Push_P of a node from a secure domain and pushes the Push_P on several nodes that are in a non-secure domain | All the nodes from the non-secure domain that detect the Push_P event shall join the secure domain |
| 7A | Fault case - single/multi-pairing mode - the user pushes only on one node of a non-secure domain | Nothing should happen in this case. The node stays in a non-secure domain |
| 7B | Fault case - Single/multi-pairing mode - the user pushes only on one node that is in the IDLE state | Nothing should happen in this case. The node stays in a non-secure domain |
| 8 | Fault case - single/multi-pairing mode - the user pushes only on one node of a secure domain | Nothing should happen on this case. |
| 9 | Fault case - In single pairing mode - when a user pushes the Push_P on a node in a secure domain and the Push_P on two other nodes from a non-secure domain | Only one of the nodes from the non-secure domain shall join to the secure domain and the other shall not create its own secure domain. Instead it should return to its previous state before the Push_P event |

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method in a first network node to become part of a secure domain, the first network node communicating with one or more other network nodes over a communication medium, the method comprising:
   receiving a signal indicative of a button press event at the first network node;
   in response to receiving the signal indicative of the button press event, setting a pairing period;
   in response to setting the pairing period, configuring the first network node as endpoint for a first time interval within the pairing period;
   in response to configuring the first network node as endpoint for the first time interval, trying to detect, during the first time interval, a first signal from a second network node being any of the one or more other network nodes, wherein the first signal indicates that the second network node is domain master of a first secure domain;
   in response to detecting the first signal from the second network node during the first time interval, sending a pairing request to the second network node to try to pair with the second network node and to join the first secure domain;
   in response to the expiration of the first time interval without detecting the first signal from any of the one or more other network nodes, configuring the first network node, for a second time interval within the pairing period, as temporary domain master of a second secure domain, wherein the second time interval has a time duration different from the time duration of the first time interval;
   in response to the first network node being configured as temporary domain master for the second time interval, transmitting the first signal and trying to detect, during the second time interval, a pairing request transmitted from a third network node being any of the one or more other network nodes;
   in response to receiving a pairing request transmitted from the third network node of the one or more network nodes during the second time interval, sending a pairing response to the third network node to join the third network node to the second secure domain; and
   in response to the expiration of the second time interval without detecting the pairing request from any of the one or more other network nodes, configuring the first network node alternately as endpoint for the first time interval and as temporary domain master for the second time interval, until the expiration of the pairing period, wherein for the remaining pairing period after the initial first interval, the first time interval is shorter than the second time interval.

2. The method of claim 1, wherein for the remaining pairing period after the initial first interval, the second time interval comprises randomized time values and the first time interval comprises fixed time values.

3. The method of claim 1, wherein the first signal comprises a media access plan signal including a random domain name and a password associated with a temporary secure domain.

4. The method of claim 3, wherein trying to detect, during the first time interval, the first signal from the second network node comprises:
   trying to detect, during the first time interval, for a media access plan signal from the second network node.

5. The method of claim 1, further comprising:
   in response to joining the third network node to the second secure domain, trying to detect for a re-registration request from the third network node within the pairing period; and
   in response to receiving the re-registration request from the third network node within the pairing period, configuring the first network node as permanent domain master of the second secure domain.

6. The method of claim 5, further comprising:
   in response to not receiving the re-registration request from the third network node within the pairing period, configuring the first network node as conditional permanent domain master of the second secure domain;
   in response to the first network node being configured as conditional permanent domain master, setting a re-registration time period and trying to detect for a re-registration request from the third network node during the re-registration time period; and in response to receiving the re-registration request from the third network node within the re-registration time period, configuring the first network node as permanent domain master of the second secure domain.

7. The method of claim 6, further comprising:

in response to the expiration of the re-registration time period without detecting the re-registration request, configuring the first network node as a non-secure network node.

8. The method of claim 1, further comprising:

in response to the first network node pairing with the second network node while the second network node is acting as temporary domain master of the first secure domain, trying to detect during the pairing period the first signal from a fourth network node, wherein the fourth network node is a permanent domain master of a third secure domain, the permanent domain master being any of the one or more other network nodes;

in response to detecting the first signal from the fourth network node within the pairing period, sending a pairing request to the fourth network node to attempt to pair with the fourth network node and to join the third secure domain; and in response to the expiration of the pairing period without detecting the first signal from any network node which is a permanent domain master of a secure domain, trying to pair with the second network node and to join the first secure domain.

9. The method of claim 1, wherein for the remaining pairing period after the initial first interval, the first time interval of acting as endpoint comprises 1 second, the second time interval for acting as temporary domain master comprises a randomized value between 1 and 4 seconds and the pairing period comprises 120 seconds.

10. The method of claim 1, further comprising:

in response to pairing with the third network node while the first network node is configured as temporary domain master and within the pairing period, transmitting the first signal and trying to detect a pairing request transmitted from any of the one or more other network nodes;

in response to receiving a pairing request transmitted from a fourth network node of the one or more network nodes during the pairing period, transmitting a pairing response to the fourth network node to attempt to pair with the fourth network node; and forming the second secure domain including the first network node, the third node and the fourth node at the expiration of the pairing period.

* * * * *

UNITED STATES PATENT AND TRADEMARK OFFICE
CERTIFICATE OF CORRECTION

PATENT NO. : 11,063,632 B2  
APPLICATION NO. : 16/533591  
DATED : July 13, 2021  
INVENTOR(S) : Avner Aloush Page 1 of 1

It is certified that error appears in the above-identified patent and that said Letters Patent is hereby corrected as shown below:

On the Title Page

Delete Item [73] and replace it with the following:  
[73] Assignee: Integrated Silicon Solution Israel Ltd., Tel Aviv (IL)

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*